United States Patent Office 2,801,698
Patented Aug. 6, 1957

2,801,698

INCREASING EFFECTIVE PERMEABILITY OF ROCK AROUND A WELL BORE

Donald C. Bond, Crystal Lake, Ill., assignor to The Pure Oil Company, Chicago, Ill., a corporation of Ohio No Drawing. Application October 27, 1954,
Serial No. 465,137

10 Claims. (Cl. 166—22)

This invention relates to a method for stimulating the production of a fluid-bearing subterranean reservoir. It is specifically concerned with the fracturing of geological formations surrounding a well bore.

In the development of fluid-producing geological formations, strata are discovered which, although they are known to contain large quantities of a desired fluid, will not produce at satisfactory rates because of the internal resistance of the formation to fluid flow. This resistance is due to a number of factors such as poor permeability, discontinuous porosity, mud coatings formed on the walls or introduced into the interstices of the producing formations, etc. Therefore, before these wells can be placed in routine production, it is necessary to employ special, well-completion procedures. This problem has been one of long standing duration. Accordingly, there has been considerable development of remedial techniques such as underreaming, shooting and acidizing which are employed when it is necessary to penetrate large areas to effect stimulation. A more recent expedient for use in completion or stimulation work is the hydraulic fracturing procedure which was developed as the "Hydrafrac" process. This process consists of (1) introducing into the formation a viscous liquid hydraulic medium at a sufficient pressure to overcome the overburden pressure and fracture the formation; (2) changing the fluidity characteristics of the hydraulic medium from a high to a low viscosity so it may readily be removed from the formation. A more complete description of the details of this hydraulic process for increasing the productivity of wells is to be found in U. S. Patents 2,596,843, 2,596,844 and others. The pressure-parting phenomenon is not new having been recognized as an incident to other well-completion techniques such as acidizing, squeeze-cementing, etc. Even the use of simple non-thickening hydraulic media such as heavy petroleum oil distillates had been employed in the fracturing of selected formations prior to the development of the "Hydrafrac" process. However, it was impossible or impracticable to employ this simple hydraulic fracturing technique employing a fluid of high penetrating ability in formations of normal permeability because such high pumping rates were required in order to build up a sufficient pressure within the formation in order to effectuate its fracture. However, with the development of fracturing techniques where the primary objective is the development and exploitation of a producing formation by hydraulic fracturing by employing a temporary, highly viscous, pressure-transmitting medium of low penetrating ability, formation fracturing has become an established well-completion process. The "Hydrafrac" hydraulic fracturing process is highly flexible in its operation and can be adapted to either open-hole or set-through completions. However, there are encountered a number of areas which require a high injection rate and large volume of fracturing fluid in order to effectuate the fracturing of these formations to enhance their production rates. In some fracturing jobs injection rates as high as 65 barrels per minute were employed for short periods of time. Even the more common rates of 30 to 40 barrels per minute are considered high. This requires either the use of a plurality of conventional-type pumping units or specially designed pumping equipment to accommodate the larger volume treatments or high injection rates. Thus, in certain instances the Hydrafrac process encounters the same difficulty, namely, high pumping rates, which gave rise to its development as an improvement over the use of a simple non-thickened hydraulic medium of high penetrating ability for use in the fracturing of geological formations.

Therefore, it is an object of this invention to provide a hydraulic fracturing technique which can employ a simple non-thickened fluid as a pressure-transmitting medium in a hydraulic fracturing technique. Another object of this invention is to provide a process which will effect the hydraulic fracturing of a formation at a lower pumping pressure and rate than is necessary in the conventional hydraulic fracturing process which uses a highly viscous, gel-thickened fluid as the fracturing medium. It is a further object of this invention to provide a hydraulic fracturing process which avoids the difficulties encountered in the use of gel breakers, incomplete gel breaking and emulsification of gel and water caused by the gelling agents conventionally used to thicken the fracturing fluid to the desired viscosity.

The principal problem which was solved by the "Hydrafrac" process was the development of a thickened fluid against which the formations offer a natural resistance to flow therethrough. These fluids which were characterized by their low penetrating tendencies were impeded in their flow through a formation of relatively low permeability which permitted the building up of a sufficient pressure through pumping rate and volume to overcome the overburden pressure and fracture the formation. According to the instant invention the use of gels to thicken fracturing fluids and their attendant disadvantages can be avoided, and fracturing of formations to increase their productivity can be accomplished with lower pumping rates and pumping pressures in the fracturing of selected producing intervals by initially sealing the formation interstices with ice or a solid hydrate followed by the application of hydraulic pressure to the interval. In applying the hydraulic pressure, the fluid employed is a simple non-thickened medium such as crude oil or various fractions derived therefrom such as kerosene, diesel oil, gas oil, etc., conventional organic liquids used in the transmission of hydraulic pressure such as the viscous liquid glycols, polyoxyalkylene glycols, and their derivatives. Suitable fluids of this nature are marketed by Union Carbide and Carbon Company under the mark "Ucon" hydralubes. It is also possible to employ water as the pressure-transmitting medium. In addition, gaseous fracturing mediums, e. g., air or natural gas, could be employed if compressed gas was readily available. However, the cost and danger resulting from the use of gaseous media makes this expedient less preferable than liquid hydraulic pressure-transmitting fluids. However the preferred fracturing fluids are kerosene or other petroleum distilled oils because of their low cost, availability, and freedom from deleterious reaction with the reservoir rock and its fluid contents.

In carrying out the instant invention the producing zone or interval to be treated is sealed in the area adjacent the bore hole by freezing water disposed in the zone interstices. This water may be indigenous formation-water which is present as connate or other types of naturally-occurring water. While practically all oil-producing formations are also water-yielding, there are encountered oil-producing formations which do not contain sufficient water to permit their sealing by freezing. In this instance, it would be necessary to introduce into the formation adjacent the well bore sufficient amounts of water whereby the freezing of this water will effect the sealing of the saturated interval. In order to seal the formation interstices effectively, about 50% or more of the formation interstices should be filled with water. In the event that it is necessary to supplement the amount of naturally-occurring water within the formation or introduce water into water-free sections, the injected water may be retained adjacent the well bore by regulating the injection pressure so that it is substantially equal to the formation pressure.

Another expedient for sealing the interval of the formation to be treated is the formation of solid hydrates within the formation adjacent the well bore. It is well known that a number of gaseous materials when mixed with water form a solid material which expands upon solidification. These solid hydrates also may be employed for sealing the formation zone to be treated prior to the application of the hydraulic pressure. Suitable materials for forming hydrates in earth strata include the lower boiling paraffinic hydrocarbons, methane, ethane, propane, iso- and n-butane; alkyl chlorides, such as methyl chloride; gases such as hydrogen sulfide, carbon dioxide, sulfur dioxide, nitrous oxide, chlorine, argon, etc. An important advantage in the use of hydrate-forming materials to seal the formation is the relatively high temperatures at which certain hydrates will form. One material which has this property is hydrogen sulfide which will form hydrates at temperatures up to about 85° F. To produce a hydrate which will form under these conditions, it is only necessary to maintain a molar ratio of hydrogen sulfide to water of 1 to 6 within the formation interval to be treated. The advantages of solid hydrates as sealing expedients are obvious when it is recognized that many oil producing formations concomitantly produce gaseous substances which, when mixed with water, will form a solid, expanded hydrate. It is to be noted that the formation sealants that are employed in the instant invention are those normally liquid or gaseous substances which exhibit a coefficient of cubical expansion upon being converted to the solid state. This is in contradistinction to other conventional well-treating sealants such as gels, waxes, resins and other similar materials which volumetrically contract upon solidification. The use of the former type of sealants is a particular feature of this invention in that the solidification of these substances within the interstices debilitates the reservoir structure, making it more susceptible to the fracturing forces impressed upon it in the sealed condition.

In effecting the sealing of the producing interval by forming ice or solid hydrate therein, it is necessary to employ some expedient which will withdraw sufficient heat from the area to be treated. One method would be to introduce a non-freezing solution as a concentrated brine into the well bore and position it adjacent the formation to be sealed. A cooling coil connected to a conventional type of refrigerating apparatus could then be used to withdraw heat from the formation in order to freeze the water or produce a solid hydrate within the formation. Another convenient manner for producing the frozen substance within the formation involves the use of a liquefied normally gaseous material such as propane or other similar volatile substances. The water or hydrate material containing formation is contacted with the liquefied gas. The gas is then allowed to evaporate in contact with the formation to produce the necessary refrigeration required to solidify the solid-forming materials within the formation interstices adjacent the well bore. Another method involves the replacement of the water within the well bore into the formation interval being treated by a low-freezing-point substance such as gasoline, anti-freeze compositions for automobile engine cooling systems, various organic liquors such as ketones, etc. Solid $CO_2$ is disposed in the low-freezing-point liquid which is chilled below the freezing point of the water in the formation. Sufficient heat is thus withdrawn from the water to produce an ice sealant. The foregoing heat transfers are only suggestive of the various expedients that can be employed to effect the solidification of the sealant within the formation. Other means will also be obvious to those skilled in the art.

After the formation zone has been substantially completely shut off from the well bore, the pressure-transmitting medium is then introduced into the bore hole and positioned adjacent the sealed interval. Pressure is then transmitted to the area to be treated by conventional pumping apparatus such as triplex pumps or other suitable pumping means. The pressure required for fracturing will depend upon the thickness of the frozen area around the well bore. Generally less pressure will be required to fracture the sealed interval if a relatively thin cylinder of frozen sealant is provided around the well bore. However, if it is desirable to extend the fractures deeper into the formation, it will be necessary to form greater thicknesses of frozen sealant within the formation. Although it is desirable to freeze the formation to an area of about 1 to 10 feet radial thickness, a satisfactory fracturing can be obtained where only 1 to 2 feet of radial thickness is frozen within the formation interval. The pressures required will not be excessive since only the strength of the frozen area need be exceeded. This pressure will vary from about 0.6 to 1.0 times the pressure of the overburden but will usually be about 0.7–0.75 the overburden pressure. In view of the condition of the formation sealed in the manner of this invention making the formation more susceptible to fracturing, it may be expected that fracturing pressures lower than those employed in conventional pressure-parting will induce fracturing. This pressure may be related to the formation depth according to an empirical or mathematical correlation. It is obvious that the high pumping rates required in other fracturing techniques will not be needed inasmuch as the pressure-transmitting medium is not introduced into the bore hole until after the freezing of the formation has been accomplished. Thus it is not necessary to be concerned with the formation penetrating characteristics of the fracturing medium in order to develop high hydrostatic pressures within the formation.

To illustrate the effectiveness of the instant invention, an experimental demonstration was carried out employing a laboratory scale hydraulic fracturing apparatus. In one instance a Berea sandstone core 3″ in diameter and 3″ long, with a ½″ axial hole having a permeability of approximately 60 millidarcies, was placed in the hydraulic fracturing apparatus. An overburden pressure of 1,000 p. s. i. was applied and kerosene was pumped into the axial hole in the core at an average rate of 150 cc./min. The pressure was dissipated rapidly between strokes. Inspection of the core, after it was removed from the apparatus, showed that the core had not been fractured. Distilled water was passed through a similar core until the core was essentially saturated with water. The water-saturated core was placed in a refrigerator at −40° F. for two days. The frozen core was then removed from the refrigerator and placed in the hydraulic fracturing apparatus. An overburden pressure of 1,000 p. s. i. was applied at the start and kerosene was injected into the axial hole in the core. The pressure inside the core built up immediately to about 1,000 p. s. i., with injection of a small amount of kerosene. The overburden pressure was maintained about 500 p. s. i. above the injection pressure and the injection pressure was gradually increased by injection of a small amount of kerosene. When an injection pressure of 2,000 p. s. i. was reached, the pressure dropped abruptly and kerosene flowed freely through the core. When it was removed from the apparatus, the core was found to be split in two equal pieces by a vertical fracture.

In this experiment it is seen that a vertical fracture was produced instead of the horizontal fractures generally produced by conventional hydraulic fracturing techniques. By producing this type of fracturing in a producing formation, definite advantages obtain for certain applications. In particular, this type of fracture would be advantageously produced in water-injection wells because in these wells long fractures must be avoided because of the danger of channeling through a fracture from the injection well to the producing well. Therefore, by employing the instant invention in obtaining relatively short vertical fractures, a desirable increase in water injection rate can be obtained without the danger of forming a channeling fracture from the injection well to the producing well.

It is thus seen that a novel method for hydraulically fracturing fluid-bearing reservoirs has been invented. Although the foregoing illustrative and non-limiting example was concerned with the fracturing of a sandstone material, the invention also has application in the treatment of calcareous formations. The invention, although particularly adaptable for use in the treatment of formations having permeabilities of less than about 50–100 millidarcies, may be employed in treating more permeable formations. The technique is applicable in the completion or stimulation of wells producing oil, gas or water as well as in secondary recovery operations employing gas-or water-drive where it is desirable to improve the injectivity index of the formation. Water-disposal wells are also improved by means of the process of this invention. In some instances it may be desirable to include in the fracturing fluid a propping agent such as fine-grain sand, crushed sea-shells, or other granular crush-resistant substances generally employed in the hydraulic fracturing of formations. If a propping agent is to be used, it will be necessary to employ a fracturing fluid sufficiently viscous to facilitate the suspension of the agent in the fluid. The increase in productivity is obtained by the use of non-thickened, pressure-transmitting media without requiring the use of excessively high pumping rates normally necessary in carrying out hydraulic fracturing processes.

I claim:

1. A method for increasing the productivity of a fluid-bearing reservoir traversed by a bore hole which comprises introducing into said reservoir a hydrous, fluid substance convertible to a solid of increased volume upon cooling, freezing said fluid substance by withdrawing sufficient heat therefrom to effect its solidification whereby said fluid-bearing reservoir is temporarily shut off from said bore hole, introducing a non-thickened fluid, pressure-transmitting medium into said bore hole in contact with said reservoir, and applying sufficient pressure to said fluid pressure-transmitting medium whereby a force is transmitted to the temporarily shut off reservoir to overcome the strength of cohesion of said reservoir and produce fractures therein.

2. A method in accordance with claim 1 in which the non-thickened fluid pressure-transmitting medium is a petroleum oil.

3. A method for increasing the productivity of a fluid-bearing reservoir traversed by a bore hole which comprises introducing water into said reservoir, freezing said water by withdrawing heat therefrom to effect the solidification of said water in said reservoir whereby said reservoir is shut off from said bore hole, introducing a non-thickened fluid pressure-transmitting medium into said bore hole in contact with said reservoir, and applying sufficient pressure to said fluid pressure-transmitting madium whereby a force is transmitted to the temporarily shut off reservoir to overcome the strength of cohesion of said reservoir and produce fractures therein.

4. A method for increasing the productivity of a fluid-bearing reservoir which comprises introducing into said reservoir a gaseous material convertible to a solid upon hydration, freezing said gaseous material to produce a solid hydrate within said reservoir by subjecting said gaseous material to hydrate-forming conditions of temperature and pressure in the presence of sufficient amounts of water whereby said reservoir is temporarily shut off from said bore hole, introducing a non-thickened fluid pressure-transmitting medium into said bore hole in contact with the temporarily shut off reservoir and applying sufficient pressure to said medium whereby a force is transmitted to said reservoir to overcome the strength of cohesion of said reservoir and produce fractures therein.

5. A method in accordance with claim 4 in which the gaseous material is hydrogen sulfide.

6. A method in accordance with claim 4 in which the gaseous material is nitrous oxide.

7. A method in accordance with claim 4 in which the gaseous material is sulfur dioxide.

8. A method for increasing the productivity of a water-containing, fluid-bearing reservoir traversed by a bore hole which comprises freezing the water in said reservoir adjacent said bore hole whereby said reservoir is temporarily shut off from said bore hole, introducing a non-thickened fluid pressure-transmitting medium into said bore hole in contact with said reservoir, and applying sufficient pressure to said medium whereby a force is transmitted to the temporarily shut off reservoir to overcome the strength of cohesion of said reservoir and produce fractures therein.

9. A method in accordance with claim 8 in which the fluid pressure-transmitting medium is a petroleum oil.

10. A method for increasing the injectivity index of an oil-bearing reservoir traversed by an input well and an output well which comprises introducing into said reservoir a hydrous, fluid substance convertible to a solid of increased volume upon cooling, withdrawing sufficient heat from said substance to effect its solidification whereby said fluid-bearing reservoir is temporarily shut off from said input well, introducing a non-thickened fluid, pressure-transmitting medium into the temporarily shut off input well in contact with said reservoir, and applying sufficient pressure to said fluid pressure-transmitting medium whereby a force is transmitted to said reservoir to overcome the strength of cohesion of said reservoir and produce fractures therein.

References Cited in the file of this patent

UNITED STATES PATENTS

| | | |
|---|---|---|
| 1,342,780 | Vedder | June 8, 1920 |
| 2,412,765 | Buddrus et al. | Dec. 17, 1946 |
| 2,596,843 | Farris | May 13, 1952 |
| 2,661,066 | Bond | Dec. 1, 1953 |
| 2,672,935 | Braunlich et al. | Mar. 23, 1954 |
| 2,676,662 | Ritzmann | Apr. 27, 1954 |
| 2,681,704 | Menaul | June 22, 1954 |
| 2,693,857 | Marshall | Nov. 9, 1954 |
| 2,699,213 | Cardwell et al. | Jan. 11, 1955 |